(12) United States Patent
Igarashi et al.

(10) Patent No.: US 11,884,865 B2
(45) Date of Patent: Jan. 30, 2024

(54) LIQUID CRYSTAL EMULSIFICATION METHOD AND LIQUID CRYSTAL EMULSION

(71) Applicant: WACKER CHEMIE AG, Munich (DE)

(72) Inventors: Kenji Igarashi, Chikusei (JP); Shinichi Araki, Chikusei (JP); Yoko Hori, Chikusei (JP)

(73) Assignee: Wacker Chemie AG, Munich (DE)

( * ) Notice: Subject to any disclaimer, the term of this patent is extended or adjusted under 35 U.S.C. 154(b) by 0 days.

(21) Appl. No.: 17/791,285

(22) PCT Filed: Dec. 10, 2020

(86) PCT No.: PCT/EP2020/085620
§ 371 (c)(1),
(2) Date: Jul. 7, 2022

(87) PCT Pub. No.: WO2021/139960
PCT Pub. Date: Jul. 15, 2021

(65) Prior Publication Data
US 2022/0403246 A1  Dec. 22, 2022

(30) Foreign Application Priority Data
Jan. 8, 2020 (JP) ................................ 2020-001273

(51) Int. Cl.
*C09K 19/52* (2006.01)
*C09K 19/40* (2006.01)

(52) U.S. Cl.
CPC ............ *C09K 19/52* (2013.01); *C09K 19/408* (2013.01); *C09K 2019/528* (2013.01)

(58) Field of Classification Search
CPC ...................................................... C09K 19/52
See application file for complete search history.

(56) References Cited

U.S. PATENT DOCUMENTS

| 5,942,216 A | * | 8/1999 | Herb | ................. | A61K 8/41 |
| | | | | | 514/975 |
| 2016/0213579 A1 | * | 7/2016 | Lee | ................. | A61K 8/553 |

FOREIGN PATENT DOCUMENTS

| EP | 0715842 A2 | 6/1996 |
| EP | 1801185 A1 | 6/2007 |
| EP | 3156043 A1 | 4/2017 |

(Continued)

OTHER PUBLICATIONS

J. Soc. Cosmet. Chem. Japan, vol. 44, No. 2 (2010), p. 103.
J. Soc. Cosmet. Chem. Japan, vol. 44, No. 3 (2010), p. 199.

*Primary Examiner* — Chanceity N Robinson

(57) ABSTRACT

A liquid crystal emulsification method that can reduce formulation restriction and adjust the size of a dispersed phase with small variation in size of the dispersed phase, and a liquid crystal emulsion are provided. The liquid crystal emulsification method includes: adding a moisture content and/or an oil content at a predetermined ratio to a surfactant having an HLB falling within a predetermined range; and setting a temperature during formation of a dispersion or an emulsion to a predetermined temperature, to adjust a lamellar liquid crystal having a regular molecular arrangement in which the oil content and/or the moisture content are alternately arranged in a bilayer membrane formed from the surfactant.

2 Claims, 4 Drawing Sheets

Schematic view of a whole production system of an oil-in-water type emulsion

(56) References Cited

FOREIGN PATENT DOCUMENTS

| | | |
|---|---|---|
| JP | 3987551 B2 | 10/2007 |
| JP | 2007314442 A | 12/2007 |
| JP | 2018083769 A | 5/2018 |

\* cited by examiner

Schematic view of a whole production system of an oil-in-water type emulsion

Schematic view of main part of liquid crystal emulsification device of liquid crystal phase formation unit Schematic view illustrating formation and growth of lamellar liquid crystal

LIQUID CRYSTAL EMULSIFICATION METHOD AND LIQUID CRYSTAL EMULSION

CROSS-REFERENCE TO RELATED APPLICATIONS

This application is a U.S. National Phase Application of PCT/EP2020/085620, filed Dec. 10, 2020, which claims priority to Japanese Application No. 2020-001273 filed Jan. 8, 2020, the entire disclosures of which are hereby incorporated by reference.

BACKGROUND

Technical Field

The present invention relates to a liquid crystal emulsification method and a liquid crystal emulsion, and more particularly, a liquid crystal emulsification method that can reduce formulation restriction and adjust the size of a dispersed phase with small variation in size of the dispersed phase and a liquid crystal emulsion.

Background Art

As disclosed in J. Soc. Cosmet. Chem. Jpn., Vol. 44, No. 2 (2010), on p. 103, a fine emulsion that is produced through a region of infinite association of molecules like a liquid crystal or a D-phase in an emulsification process has been known.

Specifically, a liquid crystal emulsification method, a phase inversion emulsification method, a phase inversion temperature emulsification method, a D-phase emulsification method, and the like are exemplified.

The liquid crystal emulsification method is a technique for producing fine emulsion particles in which a dispersed phase (in an O/W emulsion, an oil phase) is dispersed and held in a liquid crystal formed by a surfactant. Emulsification includes a two-stage process including a first step of dispersing and holding an oil phase in a liquid crystal to produce an oil-in-liquid crystal (O/LC) type emulsion, and a second step of adding a water phase to the O/LC emulsion to produce an O/W emulsion. In the step of producing the O/LC emulsion, surfactant molecules constituting the liquid crystal are efficiently oriented to an oil/water interface to reduce the interfacial tension, and emulsion particles are protected by a strong liquid crystal film against coalescence.

As the liquid crystal, a lamellar liquid crystal, an inverted hexagonal liquid crystal, or a cubic liquid crystal is used. For an inverted hexagonal liquid crystal, a high-hydrophobic surfactant is used. For a cubic liquid crystal, a high-hydrophilic surfactant is used and a temperature history from melting temperature to normal temperature is required. A lamellar liquid crystal is hardly affected by the kind of oil component (desired HLB) and such a temperature history is not required.

The phase inversion emulsification method is a method in which a surfactant is dissolved in an oil phase, a water phase is then added and stirred, and a continuous phase is inverted from the oil phase to the water phase to produce an O/W emulsion. In the phase inversion emulsification method, factors such as the kind of the surfactant and the addition rate of the water phase are complicated and involved. It is pointed out that it is difficult to adjust an emulsion having good reproducibility. For production of a uniform and fine emulsion, it is pointed out that it is necessary to perform steps of solubilization, production of a lamellar liquid crystal, production of an O/D (surfactant) emulsion, and production of an O/W emulsion in turn.

The phase inversion temperature emulsification method is an emulsification method using a phase inversion temperature described below. Ina three-component system including a nonionic surfactant, oil, and water, the nonionic surfactant is infinitely associated at a certain temperature, and the system is separated as a macroscopic phase containing large amounts of oil and water. With a further increase in temperature, the nonionic surfactant is dissolved in the oil phase to form reverse micelles, and water is solubilized. At a temperature near the phase inversion temperature, the coalescence rate of oil droplets is also high. Therefore, a thermal procedure of abruptly cooling the system to a temperature region that is stable to coalescence is greatly restricted.

The D-phase emulsification method is a method in which a polyhydric alcohol is added as a fourth component to a surfactant, oil, and water, to produce a fine O/W emulsion. In midstream, an O/D (surfactant) emulsion is produced. At that time, when the concentration of the surfactant is high, a hexagonal phase and a lamellar liquid crystal are expressed. For destruction of association structure of such a liquid crystal, addition of the polyhydric alcohol is required.

As described above, a liquid crystal state, in particular, a lamellar liquid crystal is formed not only in the liquid crystal emulsification method but also in the phase inversion emulsification method, the phase inversion temperature emulsification method, and the D-phase emulsification method.

In this respect, Japanese Patent No. 3987551 discloses a method for producing a liquid crystal emulsion composition. In this method for producing a liquid crystal emulsion composition, the kind of a surfactant is limited, a high-hydrophilic nonionic surfactant and a lipophilic surfactant are used, and the ratio of the surfactants to oil is limited. By doing so, emulsification is performed while lowering the interfacial tension. As a result, 100% of lamellar liquid crystal is produced, so that the whole system in a liquid crystal state is formed.

A lamellar liquid crystal has a basic skeleton in which many layers of a surfactant are stacked at a level of molecular structure.

In a structure of the lamellar liquid crystal, a dispersed phase is disposed between the layers. The lamellar liquid crystal can be formed at comparatively wide-range concentration and temperature regions. The lamellar liquid crystal has an advantage in which it is less likely to be affected by temperature and the kind of oil to be emulsified.

However, when in the conventional method for producing a liquid crystal emulsion composition through a lamellar liquid crystal, for example, a target product is an O/W emulsion, it is difficult to intentionally make the particle size of oil droplets fine.

In particular, the method is passive in terms that emulsion particles are protected by a strong liquid crystal film against coalescence, that is, an increase in particle diameter of oil droplets is suppressed.

An O/W emulsion is used in many use applications including cosmetics and a technique for intentionally adjusting the particle size of oil droplets is desired.

J. Soc. Cosmet. Chem. Jpn., Vol. 44, No. 3 (2010), on p. 199, reports that control of particle size of an emulsion is conventionally classified into preparation of fine emulsion using a solubilization region and preparation of fine emulsion using a high-pressure homogenizer, and the preparations have disadvantages described below. In the former, a region where micelles are produced in an aqueous solution to solubilize an oil is used, and therefore a use temperature range is small, stabilization is insufficient, and formulation is restricted. In the latter, the distribution of particle size is large.

Japanese Patent Application Laid-Open No. 2007-314442 discloses an oil-in-water type emulsion cosmetic material including a gel mixture containing a hydrogenated phospholipid containing phosphatidyl choline and a water-soluble polyhydric alcohol as main components, and another component, and a method for producing an oil-in-water type emulsion cosmetic material through a lamellar liquid crystal that is obtained by adding water to the gel mixture. This method is also called a gelation emulsification method. As disclosed in Japanese Patent Application Laid-Open No. 2007-314442, the particle diameter can be controlled to 10 µm or less. However, this cosmetic material is considered to have a lipid bilayer structure, and therefore to be not suitable for control to fine particle size.

CITATION LIST

Non-Patent Literature

Non-Patent Literature 1: J. Soc. Cosmet. Chem. Jpn., Vol. 44, No. 2 (2010), p. 103
Non-Patent Literature 2: J. Soc. Cosmet. Chem. Jpn., Vol. 44, No. 3 (2010), p. 199

BRIEF SUMMARY

Embodiments of a liquid crystal emulsification method are described below. In an embodiment, the method comprises producing in a water-in-oil type pre-emulsion production unit a water-in-oil type pre-emulsion, which is then transferred to a liquid crystal phase formation unit. A liquid crystal phase in a transition state between a water-in-oil type pre-emulsion and an oil-in-water type emulsion is formed, which is then transferred to the oil-in-water type emulsion production unit, wherein an oil-in-water type emulsion is produced. The method further comprises adding a moisture content and a silicone composition as an oil content at a predetermined ratio to a nonionic surfactant having an HLB falling within a predetermined range which represents a balance of hydrophilicity and lipophilicity, of 8.0 to 19.0. The method also comprises setting a temperature during formation of a dispersion or an emulsion to a predetermined temperature by cooling to a temperature selected from a temperature range of −40° C. to −5° C. to adjust the particle diameter of a final oil-in-water type emulsion by controlling particle diameter of a final oil-in-water type emulsion, and a predetermined shear energy is applied according to the selected temperature to adjust a lamellar liquid crystal having a regular molecular arrangement in which the oil content and the moisture content are alternately arranged in a bilayer membrane formed from the surfactant.

BRIEF DESCRIPTION OF THE SEVERAL VIEWS OF THE DRAWING

The above, as well as other advantages of the present invention will become readily apparent to those skilled in the art from the following detailed description when considered in the light of the accompanying drawings in which.

DETAILED DESCRIPTION

Solution to Problem

Figure 1:
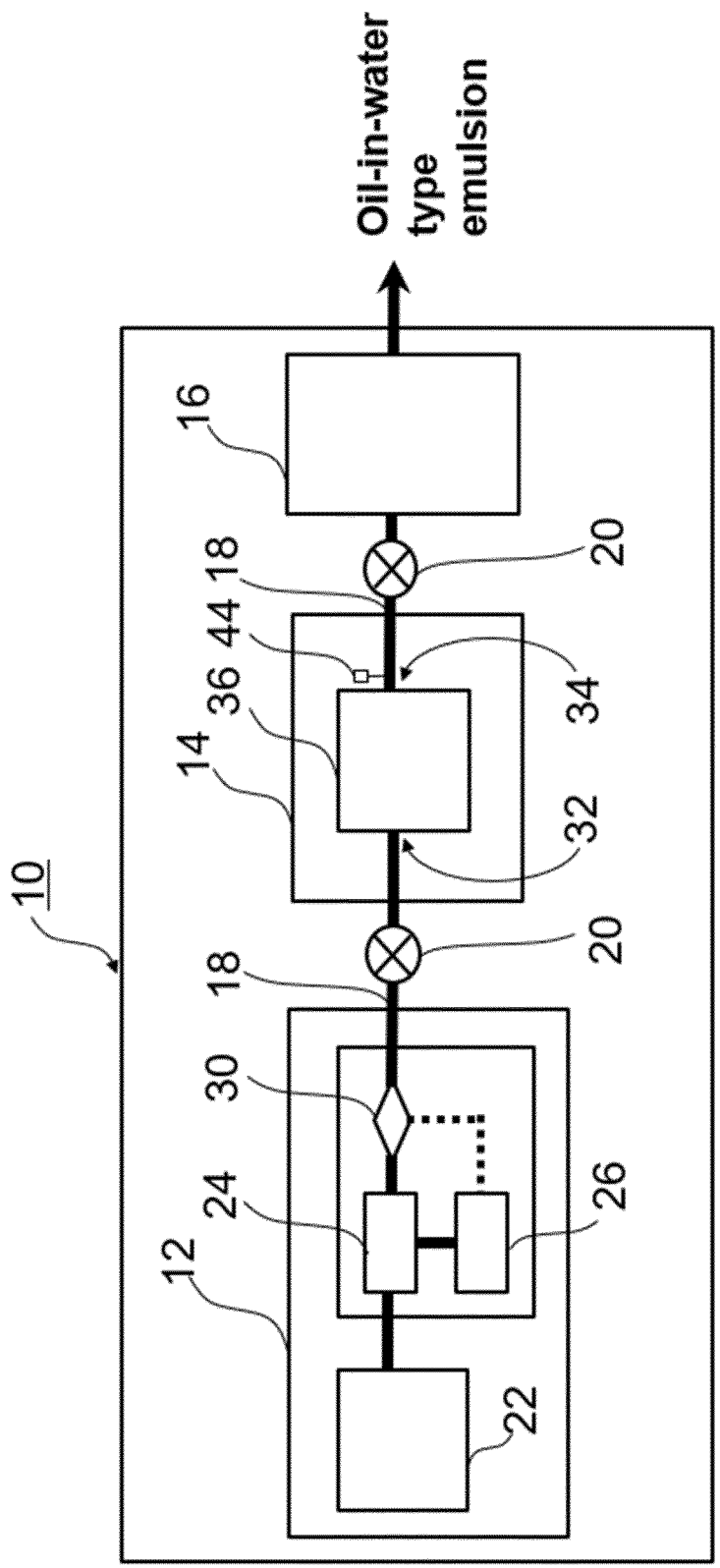
FIG. 1 is a schematic view of a whole production system of an oil-in-water type emulsion according to an embodiment of the present invention.

In order to achieve the object, a liquid crystal emulsification method of the present invention including adding a moisture content and/or an oil content at a predetermined ratio to a surfactant having an HLB falling within a predetermined range, and setting a temperature during formation of a dispersion or an emulsion to a predetermined temperature, to adjust a lamellar liquid crystal having a regular molecular arrangement in which the oil content and/or the moisture content are alternately arranged in a bilayer membrane formed from the surfactant.

In the above-mentioned configuration, the lamellar liquid crystal is not a thermotropic liquid crystal but a lyotropic liquid crystal, and restriction of temperature range to expression of liquid crystal is comparatively small. Additionally, the lamellar liquid crystal is not a nematic liquid crystal or a cholesteric liquid crystal but a smectic liquid crystal. Therefore, the lamellar liquid crystal has high regularity of molecular arrangement and properties close to those of a solid crystal, as compared with other liquid crystals. The present invention had been made by focusing on characteristics of such a lamellar liquid crystal.

In particular, it has been found that the structure of the bilayer membrane formed from the surfactant that is a basic skeleton of the formed lamellar liquid crystal varies depending on the temperature at which the lamellar liquid crystal is formed.

More specifically, as the temperature in formation of the lamellar liquid crystal is lower, the basic skeleton of the formed lamellar liquid crystal, in particular, an interlayer distance tends to be smaller. For example, when a target product is an O/W emulsion, the oil content enters a space between the layers formed at a regular molecular arrangement that is the basic skeleton of the lamellar liquid crystal, and the size of the oil content entering the space between the layers is different. Therefore, the particle size of oil droplets of the O/W emulsion is affected with small variation in size. Accordingly, the method can reduce formulation restriction and adjust the size of a dispersed phase with small variation in size of the dispersed phase.

Furthermore, an O/W emulsion including a nonionic surfactant, a silicone composition as an oil content, and a moisture content may preferably be formed at a predetermined temperature, and then cooled over a predetermined temperature, to form a lamellar liquid crystal having a regular molecular arrangement in which the oil content and the moisture content are alternately arranged in the bilayer membrane formed from the surfactant.

In addition, an O/W emulsion including a nonionic surfactant, a silicone composition as an oil content, and a moisture content may preferably be formed, and then cooled to a temperature selected from a temperature range of −40° C. to −5° C., and a predetermined shear energy may preferably be applied according to the selected temperature, to form a lamellar liquid crystal having a regular molecular arrangement in which the oil content and the moisture content are alternately arranged in the bilayer membrane formed from the surfactant.

From a dispersion of a surfactant and water, a lamellar liquid crystal in which a moisture content may be disposed in a bilayer membrane formed from the surfactant may be formed, and then cooled to a certain temperature during addition of an oil content, and a shear energy may be applied, to form a lamellar liquid crystal in which the oil content and the moisture content are alternately arranged in the bilayer membrane formed from the surfactant.

At a stage when a lamellar liquid crystal in which a moisture content is disposed in a bilayer membrane formed from a surfactant is formed from a dispersion of the surfactant and water, the dispersion may be cooled to a certain temperature, an oil content may be added to the dispersion, and a shear energy may be applied, to form a lamellar liquid crystal in which the oil content and the moisture content are alternately arranged in the bilayer membrane formed from the surfactant.

DESCRIPTION OF EMBODIMENTS

Hereinafter, embodiments of the present invention will be described in detail using a case where an O/W emulsion is continuously produced from a W/O emulsion through a liquid crystal emulsion of a lamellar liquid crystal using a so-called rotor/stator-type shear device as an example with reference to the drawings.

In particular, an oil-in-water type emulsion that is obtained by using a nonionic surfactant and containing a silicone composition as an oil content will be described by means of use application of a release material used for a release film as an example.

A liquid crystal emulsification method or a liquid crystal emulsion of the present invention is not limited to a case where an oil content is a silicone composition or a case where a W/O emulsion is used.

In recent years, the size, thickness, and weight of various electronic devices have been decreased and a multilayer structure has been increased. Therefore, during production of the devices, a release film is often required. This is because for an adhesive for an optical devices, such as a touch panel and a display or in a process of producing a light, thin, and small electronic device having a multilayer structure, a step is often used in which on a surface (hereinafter sometimes referred to as a release surface) on a side opposite to a contact surface of a release agent layer in a release film with a film substrate, a film formed from another material is layered and the film is released in a downstream process, or another material (hereinafter such a material is sometimes referred to as a coating material) is applied to the release surface and dried, and the dried material is released in a downstream process. The step in which a tackiness agent or a coating material is applied to a release surface and dried, and the dried material is released in a downstream process is particularly frequently used during production of the light, thin, and small electronic device having a multilayer structure. It is necessary that this step can be performed even when a polar coating material is thinly applied to a release film (so that the thickness is on the order of several nanometers to micrometers), dried, and then released since a thinner layer of the coating material is formed due to a decrease in size, thickness, and weight of various recent electronic devices and formation of a multilayer structure.

Accordingly, high smoothness is required for a surface of the release film, and it is necessary that a projection and the like be hardly present. In addition, a decrease in the particle diameter of emulsion is required to achieve the surface state of the release film as described above.

As a release agent used for such a release film, a release agent containing a silicone is suitably used from the viewpoint of imparting excellent release properties. An emulsion-type release agent having more advantages in safety and applicability than those of a solvent-containing release agent and a solventless release agent is more preferably used.

As illustrated in FIG. 1, an oil-in-water type emulsion production system 10 schematically includes a water-in-oil type pre-emulsion production unit 12, a liquid crystal phase formation unit 14, and an oil-in-water type emulsion production unit 16, and the water-in-oil type pre-emulsion production unit 12, the liquid crystal phase formation unit 14, and the oil-in-water type emulsion production unit 16 in this order are communicatively connected through a pipe 18. By a liquid transfer pump 20 disposed in the middle of the pipe 18, a water-in-oil type emulsion produced in the water-in-oil type pre-emulsion production unit 12 is transferred to the liquid crystal phase formation unit 14. In the liquid crystal phase formation unit 14, a liquid crystal phase in a transition state between a water-in-oil type pre-emulsion and an oil-in-water type emulsion is formed, and the formed liquid crystal phase is transferred to the oil-in-water type emulsion production unit 16. In the oil-in-water type emulsion production unit 16, an oil-in-water type emulsion is produced. Thus, the oil-in-water type emulsion that is a final target product is produced.

The water-in-oil type pre-emulsion production unit 12 schematically includes an emulsification dispersion unit 22 and a cooling unit 24. The emulsification dispersion unit 22 may be a conventional emulsifier that uses a mechanical stirring force to apply a shear force to droplets, resulting in dispersion. A high-speed stirrer that is exemplified by a homogenizer, an ultrasonic homogenizer, or a high-pressure homogenizer, or the like can be used.

In the emulsification dispersion unit 22, the ratio of the amount of a moisture content, the amount of a silicone composition as an oil content described below, and the amount of a nonionic surfactant described below is selected, and emulsification and dispersion are performed.

The configuration of the oil-in-water type silicone emulsion composition is typically represented as follows.

(A) 20 to 60% by mass of a diorganopolysiloxane having an average composition formula represented by the general formula (1), and containing two or more alkenyl groups bonded to a silicon atom in one molecule,

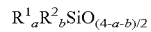

(1)

(in the formula, $R^1$ is the same or different monovalent hydrocarbon group containing no aliphatic unsaturated group, $R^2$ is an alkenyl group, a is 0.998 to 2.998, b is 0.002 to 2, and a+b is 1 to 3), (B) 5 to 30 parts by mass of an organohydrogenpolysiloxane having an average composition formula represented by the general formula (2) and containing two or more hydrogen atoms bonded to a silicon atom,

$$R^6{}_d H_e SiO_{(4-d-e)/2} \qquad (2)$$

(in the formula, $R^6$ is the same or different monovalent hydrocarbon group containing no aliphatic unsaturated group, d is 0.999 to 2.999, e is 0.001 to 2, and d+e is 1 to 3), (C) 1 to 10 parts by mass of a nonionic surfactant,
(D) 1 to 500 ppm of a platinum-based catalyst relative to the component (A), and
(E) 30 to 80 parts by mass of water.

The configuration of the oil-in-water type silicone emulsion composition which can be adopted in the present invention is not limited to the foregoing configurations. For example, any reactive or non-reactive silicone component may be used instead of the abovementioned components (A) and (B).

(Component (A))

The component (A) is a diorganopolysiloxane having an average composition formula represented by the general formula (1) and containing two or more alkenyl groups bonded to a silicon atom in one molecule. The diorganopolysiloxane of the component (A) is hereinafter also referred to as an alkenyl organopolysiloxane.

$$R^1{}_a R^2{}_b SiO_{(4-a-b)/2} \qquad (1)$$

In the formula (1), $R^1$ is the same or different monovalent hydrocarbon group containing no aliphatic unsaturated group, $R^2$ is an alkenyl group, a is 0.998 to 2.998, b is 0.002 to 2, and a+b is 1 to 3.

In the formula (1), $R^1$ preferably has 1 to 18 carbon atoms. Also, $R^1$ is preferably bonded via SiC.

Furthermore, $R^1$ is preferably a substituted or unsubstituted hydrocarbon group having no aliphatic carbon-carbon multiple bond.

In the formula (1), $R^2$ preferably has 1 to 18 carbon atoms. $R^2$ is preferably a monovalent hydrocarbon group having an aliphatic carbon-carbon multiple bond.

In the formula (1), a is 0.998 to 2.998, b is 0.002 to 2, and a+b is 1 to 3.

In the alkenylorganopolysiloxane represented by the general formula (1), at least two $R^2$s are preferably present per molecule in average.

The alkenyl organopolysiloxane preferably has a viscosity of 5 to 100,000 mPa·s at 25° C.

Examples of the alkenyl group in the component (A) may include an alkenyl group having 2 to 8 carbon atoms such as a vinyl group, an allyl group, a 1-butenyl group, and a 1-hexenyl group. A vinyl group or an allyl group is preferable, and a vinyl group is particularly preferable. These alkenyl groups react with the component (E) described later to form a network structure. About two, preferably 1.6 or more and 2.2 or less, alkenyl groups in average are present in the molecule of the component (A). Such an alkenyl group may be bonded to a silicon atom at the terminal of a molecular chain, or to a silicon atom in the middle of the molecular chain. From the viewpoint of the curing reaction rate, an alkenyl group-containing polyorganosiloxane in which an alkenyl group is bonded only to a silicon atom at a terminal of a molecular chain is preferable.

The other organic group bonded to the silicon atom in the component (A) is preferably a substituted or unsubstituted monovalent hydrocarbon group having 1 to 12 carbon atoms and containing no aliphatic unsaturated bond. Specific examples of the other organic groups may include an alkyl group such as a methyl group, an ethyl group, a propyl group, an isopropyl group, a butyl group, an isobutyl group, a t-butyl group, a pentyl group, a neopentyl group, a hexyl group, a 2-ethylhexyl group, a heptyl group, an octyl group, a nonyl group, a decyl group, and a dodecyl group; a cycloalkyl group such as a cyclopentyl group, a cyclohexyl group, and a cycloheptyl group; an aryl group such as a phenyl group, a tolyl group, a xylyl group, a biphenyl group, and a naphthyl group; an aralkyl group such as a benzyl group, a phenylethyl group, a phenylpropyl group, and a methylbenzyl group; and a substituted hydrocarbon group obtained by substituting some or all of the hydrogen atoms in any of these hydrocarbon groups by a halogen atom, a cyano group, or the like, such as a chloromethyl group, a 2-bromoethyl group, a 3,3,3-trifluoropropyl group, a 3-chloropropyl group, a chlorophenyl group, a dibromophenyl group, a tetrachlorophenyl group, a difluorophenyl group, a β-cyanoethyl group, a γ-cyanopropyl group, and a β-cyanopropyl group. Particularly preferable organic groups include a methyl group and a phenyl group.

The component (A) may be linear or branched, and may be a mixture thereof. When the component (A) contains a branched alkenyl group-containing polyorganosiloxane, the crosslinking density becomes high. In this case, however, the peel force at a low speed becomes high and it is difficult to achieve the intended peel force. In view of this, the component (A) more preferably is linear. The alkenyl group-containing polyorganosiloxane is produced by methods known to those skilled in the art.

The viscosity of the alkenylorganopolysiloxane (A) at 25° C. is preferably in the range of 5 to 2,000,000 mPa·s, more preferably 50 to 1,000,000 mPa·s, and particularly preferably 100 to 50,000 mPa·s. When the viscosity is lower than 5 mPa·s, or is higher than 2,000,000 mPa·s, emulsification is difficult to perform, so that a stable emulsion cannot be obtained.

The content of the component (A) is 20 to 60 parts by mass relative to the total mass of the components (A) to (E) defined as 100 parts by mass. If the amount exceeds 60 parts by mass, the viscosity of the composition increases, so that its handling property may deteriorate. The content thereof is more preferably 25 to 55 parts by mass.

The alkenyl group-containing polyorganosiloxane of the component (A) is produced by methods known to those skilled in the art, and can be produced by condensation and/or ring-opening polymerization of a linear and/or cyclic low molecular weight siloxane using an acid catalyst such as sulfuric acid, hydrochloric acid, nitric acid, active clay, or tris(2-chloroethyl)phosphite, or a base catalyst such as lithium hydroxide, sodium hydroxide, potassium hydroxide, tetramethylammonium hydroxide, tetra-n-butylammonium hydroxide, tetra-n-butylphosphonium hydroxide, sodium silanolate, and potassium silanolate.

The component (A) may be a single component or a mixture of two or more kinds of components satisfying the foregoing conditions.

(Component (B))

The component (B) is an organohydrogenpolysiloxane having an average composition formula represented by the general formula (2), and containing two or more hydrogen atoms bonded to a silicon atom in one molecule, and is a crosslinking component with respect to the component (A).

$$R^3_c H_d SiO_{(4-c-d)/2} \quad (2)$$

In the formula (2), $R^3$ is the same or different monovalent hydrocarbon group containing no aliphatic unsaturated group, c is 0.999 to 2.999, d is 0.001 to 2, and c+d satisfies 1 to 3. As $R^3$, a hydrocarbon group exemplified for $R^1$ is used. $R^3$ is preferably an alkyl group, and more preferably a methyl group. The number of the hydrogen atom(s) bonded to the silicon atom of the component (B) is preferably three or more in one molecule. The viscosity of the component (B) at 25° C. is usually 1 to 3000 mPa·s, preferably 5 to 500 mPa·s.

The content of the component (B) is 5 to 30 parts by mass relative to the total mass of the components (A) to (E) defined as 100 parts by mass.
When the content of the component (B) is less than 5 parts by mass, curing of the component (A) is not sufficient, resulting in insufficient strength imparted to the release film. When the content of the component (B) exceeds 30 parts by mass, the viscosity of the composition increases and the handling property may deteriorate. In addition, the amount of the SiH group becomes excessive, and thus, there is a possibility that the unreacted crosslinking agent bleeds out after the formation of the release film and causes some troubles. The content of the component (B) is more preferably 10 to 20 parts by mass.

The mixing amount of the component (B) in the oil-in-water type silicone emulsion composition of the present invention is determined according to the number of alkenyl groups of the component (A), and is adjusted so that the ratio of the number of hydrogen atoms (NE) bonded to the silicon atom of the component (B) to the number of alkenyl groups (NA) bonded to the silicon atom of the component (A) satisfies 1.0 (NE/NA) 6.0, preferably 1.5 (NE/NA) 4.0. When NE/NA is less than 1, curing of the composition does not sufficiently proceed and the unreacted alkenyl groups remain in the release agent layer, so that the releasability tends to change over time. When NE/NA exceeds 6, the releasability is enhanced by the organohydrogenpolysiloxane contrary to the intended purpose of the present invention. The component (B) can be produced by those skilled in the art by a known method.

The component (B) may be a single component or a mixture of two or more kinds of components satisfying the foregoing conditions.

The component (A) and the component (B) react with each other to forma silicone cured product. Therefore, it is usually suitable to separately produce an emulsion containing the component (A) and the component (C) and the following components and an emulsion containing the component (B) and the component (C) and the following components to prepare them as kits, and mix these two emulsions when used. However, it is also possible to produce an emulsion containing both the component (A) and the component (B) from the beginning.

(Component (C))

The component (C) is a nonionic surfactant to disperse the components (A) and (B), and the component (D) described later in water, so that the oil-in-water type silicone emulsion composition of the present invention can be provided. The component (C) is preferably a nonionic surfactant having an HLB value, which represents a balance of hydrophilicity and lipophilicity, of 8.0 to 19.0, particularly 10.0 to 18.0, and more preferably 10.0 to 16.0. The component (C) is not particularly limited as long as it is a nonionic surfactant having the HLB value falling within the abovementioned range. If the HLB value of the surfactant used is not appropriate, even if the components can be emulsified, the storage stability and the dilution stability are poor and sufficient performance cannot be exhibited. If the HLB value exceeds 19.0, the emulsifying power disappears, and when it is less than 8.0, the resulting product is stabilized in a water-in-oil type emulsion state and a lamellar liquid crystal cannot be formed.

A surfactant having a low HLB value may be used in combination as another emulsifying aid.

Note that the suitable range of HLB always falls within the abovementioned suitable range even when the oil content is not a silicone composition, or regardless of the specific route or method of formation of the lamellar liquid crystal.

Examples of the nonionic surfactant as above may include a sorbitan fatty acid ester, a glycerin fatty acid ester, a decaglycerin fatty acid ester, a polyglycerin fatty acid ester, a propylene glycol pentaerythritol fatty acid ester, a polyoxyethylene sorbitan fatty acid ester, a polyoxyethylene sorbitol fatty acid ester, a polyoxyethylene glycerine fatty acid ester, a polyethylene glycol fatty acid ester, a polyoxyethylene alkyl ether, a polyoxyethylene polyoxypropylene alkyl ether, a polyoxyethylene alkyl phenyl ether, a polyoxyethylene castor oil, a hydrogenated castor oil, a polyoxyethylene alkylamine fatty acid amide, and a polyalkyl glycoside. These nonionic surfactants are also preferable from the viewpoint of safety, stability, and price, and can be used alone or as a mixture of two or more kinds thereof. In particular, from the viewpoint of emulsification stability, a polyoxyethylene alkyl ether is preferable. The content of the component (C) is 1 to 10 parts by mass relative to the total mass of the components (A) to (E) defined as 100 parts by mass. If the content is less than 1 part by mass, dispersion is less likely to occur, and if it exceeds 10 parts by mass, the viscosity of the composition increases, resulting in poor handleability. The content thereof is more preferably 3 to 6 parts by mass.

(Component (D))

The component (D) is a platinum group-based catalyst, i.e., a hydrosilylation catalyst that catalyzes an addition reaction that occurs when the component (A) forms a crosslinked structure via the component (B). The component (D) is contained, relative to the weight of the component (A), in an amount of 1 to 500 ppm, preferably in an amount of 5 to 200 ppm, and more preferably in an amount of 20 to 100 ppm. If the content is less than 1 ppm, it takes a long time to cure, and there is a fear that the production efficiency of the release film coated with the oil-in-water type silicone emulsion composition of the present invention becomes poor. If the content exceeds 500 ppm, the workable time of the composition is shortened, and therefore, when the composition is applied to a film substrate, workability may deteriorate.

The component (D) includes a metal or a compound containing this metal. Examples of the metal and compound thereof may include platinum, rhodium, palladium, ruthenium and iridium, and compounds containing any of these metals. It is preferable to use platinum or a compound containing platinum as the component (D). Among these, a platinum-based catalyst is particularly suitable because of its high reactivity. The metal may be fixed to a particulate carrier material (e.g., activated carbon, aluminum oxide, or silicon oxide). Examples of the platinum compound may include a platinum halide (e.g., $PtCl_4$, $H_2PtCl_4 \cdot 6H_2O$, Na$_2$PtCl$_4$·4H$_2$O, and a reaction product of H$_2$PtCl$_4$·6H$_2$O and cyclohexane), a platinum-olefin complex, a platinum-alcohol complex, a platinum-alcoholate complex, a platinum-ether complex, a platinum-aldehyde complex, a platinum-ketone complex, a platinum-vinylsiloxane complex (e.g., a platinum-1,3-divinyl 1,1,3,3-tetramethyldisiloxane complex, bis-(γ-picoline)-platinum dichloride, trimethylene-dipyridine-platinum dichloride, dicyclopentadiene-platinum dichloride, cyclooctadiene-platinum dichloride, and cyclopentadiene-platinum dichloride), a bis(alkynyl)bis(triphenylphosphine) platinum complex, and a bis(alkynyl) (cyclooctadiene) platinum complex. Hydrosilylation catalysts can also be used in a microencapsulated form. In this case, a fine particle solid that contains a catalyst and is insoluble in an organopolysiloxane is formed from, for example, a thermoplastic resin (e.g., a polyester resin or a silicone resin). The platinum-based catalyst may be used in the form of an inclusion compound, for example, in a cyclodextrin.

(Component (E))

The component (E) is water that serves as a dispersion medium when the components (A) to (D) are emulsified. Although the type of water is not particularly limited, ion-exchanged water is preferably used, and preferably has a pH of 2 to 12, particularly preferably a pH of 4 to 10. Although the use of mineral water is not recommended, if used, it is preferably used in combination with a metal deactivator or the like. The component (E) is added in an amount of 30 to 80 parts by mass, preferably 35 to 70 parts by mass, relative to the total mass of the components to be dispersed defined as 100 parts by mass.

The oil-in-water type silicone emulsion composition of the present invention is not produced by simultaneously dispersing all of the abovementioned components (A) to (D) in the component (E), but is preferably produced by preparing kits in each of which at least two or more kinds of components among the abovementioned components (A) to (D) are dispersed in the component (E), and finally mixing the kits as an oil-in-water type silicone emulsion composition. If all of the components (A) to (D) are simultaneously dispersed in the component (E), the addition reaction occurring between the components (A), (B), and (D) proceeds during the production of the composition, so that a coating film cannot be formed. Examples of the producing method may include a method in which a kit in which the components (A), (C), and (D) are dispersed in the component (E) is prepared, and a kit in which the components (B) and (D) are dispersed in the component (E) is separately prepared, and the two kits are mixed when used. Even when a plurality of kits are prepared, the component (A) and the component (B) should be prepared to be contained in such respective amounts that in the final oil-in-water type silicone emulsion composition, the ratio of the number (NE) of hydrogen atoms bonded to the silicon atom in the component (B) to the number (NA) of alkenyl groups bonded to the silicon atom in the component (A) satisfies $1.0 \leq (NE/NA) \leq 6.0$, preferably $1.5 \leq (NE/NA) \leq 4.0$. The component (C) should be prepared to be contained in such an amount that the ratio thereof relative to the weight of the component (A) is 1 to 500 ppm, preferably 5 to 200 ppm, and more preferably 20 to 120 ppm.

The oil-in-water type silicone emulsion composition of the present invention becomes an emulsion type composition which is different from the solvent type and which takes the influence on the environment and the human body into consideration, even when any kinds of the components (A) to (D) are dispersed in the component (E) as a kit. This is because the component (E) as the dispersion medium is water.

Known methods can be employed for the method of dispersing the components (A) to (D) in the component (E). For example, a method of mixing and emulsifying the abovementioned components using a homogenizer, a colloid mill, a homomixer, a high-speed stator rotor stirring apparatus, or the like can be employed. Specifically, when the components (A) to (D) are dispersed in the component (E), a part of the component (E), or water, is added to the components (A) to (D) and stirred to form a water-in-oil type product, and then the remaining portion of water is further added to form an oil-in-water type product. This can facilitate the dispersion of the components (A) to (D) and improve the stability of the emulsion.

The oil-in-water type silicone emulsion composition of the present invention may contain components other than a silicone, for example, an organic polymer or the like. If the components satisfy the desired conditions, the resulting product can have desired coatability and releasability. However, in order to obtain more sufficient coatability and releasability, it is preferable that the composition should contain a silicone as a main component.

The oil-in-water type silicone emulsion composition of the present invention may contain an adhesion improver for the purpose of increasing the adhesion to a substrate, a migration component for the purpose of adjusting releasability, or a preservative for the purpose of preservation, within a range not impairing the object of the present invention.

Examples of such components may include a common silane coupling agent as the adhesion improver, an oil-in-water type silicone emulsion as the migration component, and sorbic acid, sorbate, acetic acid, lactic acid, benzoic acid, salicylic acid, phenoxyethanol, and formalin as the preservative.

The cooling unit 24 includes a plate-type heat exchanger 26, a refrigerant temperature adjustment unit 28, and a temperature detection unit 30. The water-in-oil type pre-emulsion produced at normal temperature in the emulsification dispersion unit 22 is transferred to the plate-type heat exchanger 26. In the plate-type heat exchanger 26, the water-in-oil type pre-emulsion is cooled to a predetermined temperature using a refrigerant in which the temperature is feedback-controlled by the refrigerant temperature adjustment unit 28 on the basis of the temperature of the cooled water-in-oil type pre-emulsion that is detected by the temperature detection unit 30.

Herein, the plate-type heat exchanger 26 is conventionally known, and detailed description thereof is omitted. In the plate-type heat exchanger, a plurality of heat transfer plates are disposed in parallel to each other at intervals, and the refrigerant and the water-in-oil type pre-emulsion are caused to alternately pass through each flow path formed between the plates in a manner of alternating an opposite direction with a parallel direction. Thus, the water-in-oil type pre-emulsion is cooled by the refrigerant through the heat transfer plates.

Since the cooling temperature of the refrigerant used is low, for example, ethylene glycol or a silicone oil is preferable.

In order to prevent freezing of a large number of water droplets in the oil content of the water-in-oil type pre-emulsion in the plate-type heat exchanger 26, the flow rate of the water-in-oil type pre-emulsion to be transferred to the plate-type heat exchanger 26 is adjusted.

Accordingly, during production of the oil-in-water type emulsion, the water-in-oil type pre-emulsion at normal temperature transferred from the emulsification dispersion unit 22 can be continuously cooled to a predetermined temperature and transferred to the liquid crystal phase formation unit 14 on a downstream side, without holding the water-in-oil type pre-emulsion under cooling, for example, by storing the water-in-oil type pre-emulsion in a cooling room controlled at a predetermined temperature, that is, with energy saving and without an unnecessary process. In the liquid crystal phase formation unit 14, the liquid crystal phase is also continuously formed as described below. Therefore, the oil-in-water type emulsion can be continuously produced from the water-in-oil type pre-emulsion produced in the water-in-oil type pre-emulsion production unit 12.

The heat exchanger provided in the cooling unit 24 is not limited to a plate-type heat exchanger as long as the temperature of a pre-emulsion is adjusted within a predetermined temperature range before the pre-emulsion is supplied to the emulsification dispersion unit 22. As a modification, for example, a heat exchanger in which a hose having a wide surface area and a static mixer having a spiral blade inside thereof are built in a jacket may be used.

Figure 2:
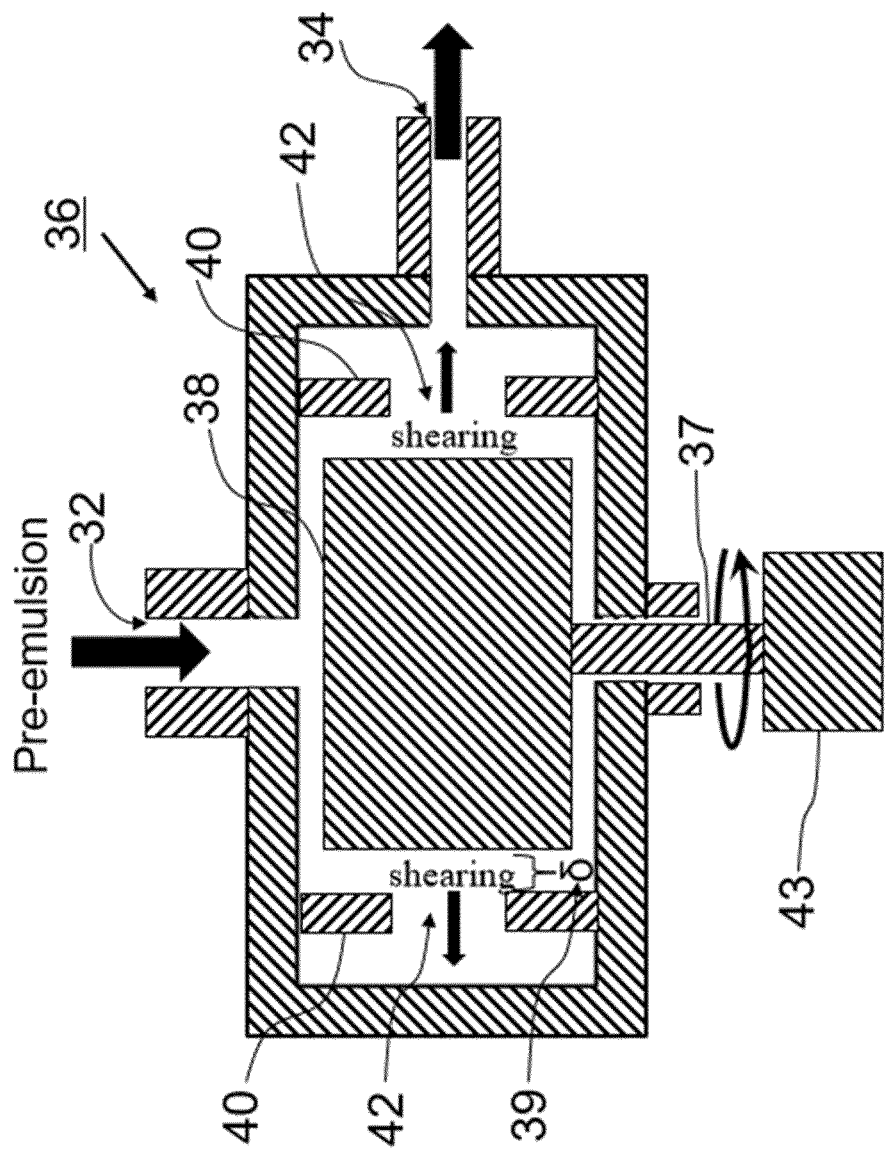
FIG. 2 is a schematic view of a main part of a liquid crystal emulsification device of a liquid crystal phase formation unit of the production system of the oil-in-water type emulsion according to the embodiment of the present invention.

As illustrated in FIG. 2, the liquid crystal phase formation unit 14 includes a rotor 38 that can be rotated around a central axis 37 as a center, and a stator 40 that is disposed concentrically as an outer cylinder at a distance (δ) of a predetermined space 39 apart from the rotor 38, in a liquid crystal phase formation container 36 having an inlet 32 from the water-in-oil type pre-emulsion production unit 12 and an outlet 34 to the oil-in-water type emulsion production unit 16. At the stator 40, a plurality of slits 42 are provided at predetermined angle intervals in a circumferential direction, and a shear energy is applied until the water-in-oil type pre-emulsion is caused to flow into the predetermined space 39 and passes through the slits 42. δ is usually set to 1 to 2 mm. A shear rate is determined by adjusting a relationship between a peripheral speed of the rotor and δ. From the value of the shear rate, a shear energy applied to a substance precent in the space can be defined.

Formation of a liquid crystal phase described herein refers to formation of a lamellar liquid crystal and fragmentation of the liquid crystal phase after the formation.

The central axis 37 is connected to a motor 43. The rotor 38 is configured to be rotated about the central axis 37 as a center like an arrow. The formed liquid crystal phase is transferred from the outlet 34 of the liquid crystal phase formation container 36 to the oil-in-water type emulsion production unit 16 on a downstream side by a rotation force of the rotor 38 as a driving source. The rotor 38 is solid. A liquid crystal phase formation container outlet temperature meter 44 is provided. The temperature of an effluent immediately after the shear energy has been applied in the liquid crystal phase formation container can be measured.

The rotor 38 and the stator 40 are disposed in combination in a vertical orientation in the liquid crystal phase formation container 36. The inlet 32 is provided directly above the predetermined space. The outlet 34 is provided on a side face of the liquid crystal phase formation container 36. To the pre-emulsion placed in the liquid crystal phase formation container 36, the shear energy is applied while the pre-emulsion flows directly into and out of the predetermined space not in a circuit system but in a passing system by a one-through method. The shear energy can be uniformly applied to the pre-emulsion without variation at all positions in the container as compared with a conventional technique for applying a shear energy in a circuit system, for example, by rotation of a shear blade provided in the container.

More specifically, when the lamellar liquid crystal in a transition state between the water-in-oil type pre-emulsion and the oil-in-water type emulsion is formed, the viscosity of the water-in-oil type pre-emulsion abruptly increases with formation of the lamellar liquid crystal. To the water-in-oil type pre-emulsion flowing into a closed space, the shear energy is applied by friction against an inner surface of the rotor 38 rotated constantly until the water-in-oil type pre-emulsion flows out of the slits 42 of the stator 40. With an increase in viscosity, the shear energy applied per time is increased.

In the present invention, a mechanism in which the lamellar liquid crystal is formed and grown at a preferable cooling temperature range of the pre-emulsion of −40° C. to −5° C. and how to confirm the formation of the lamellar liquid crystal are estimated as follows.

At a stage of forming the pre-emulsion at normal temperature, it is considered that a state where an oil phase is a continuous phase is formed. This state simply indicates a water-in-oil type emulsion. However, even when the pre-emulsion is not in this state, freezing of the whole pre-emulsion can be prevented due to the oil phase becoming a continuous phase. Accordingly, a requirement for formation of the lamellar liquid crystal is considered to be satisfied.

Figure 3:
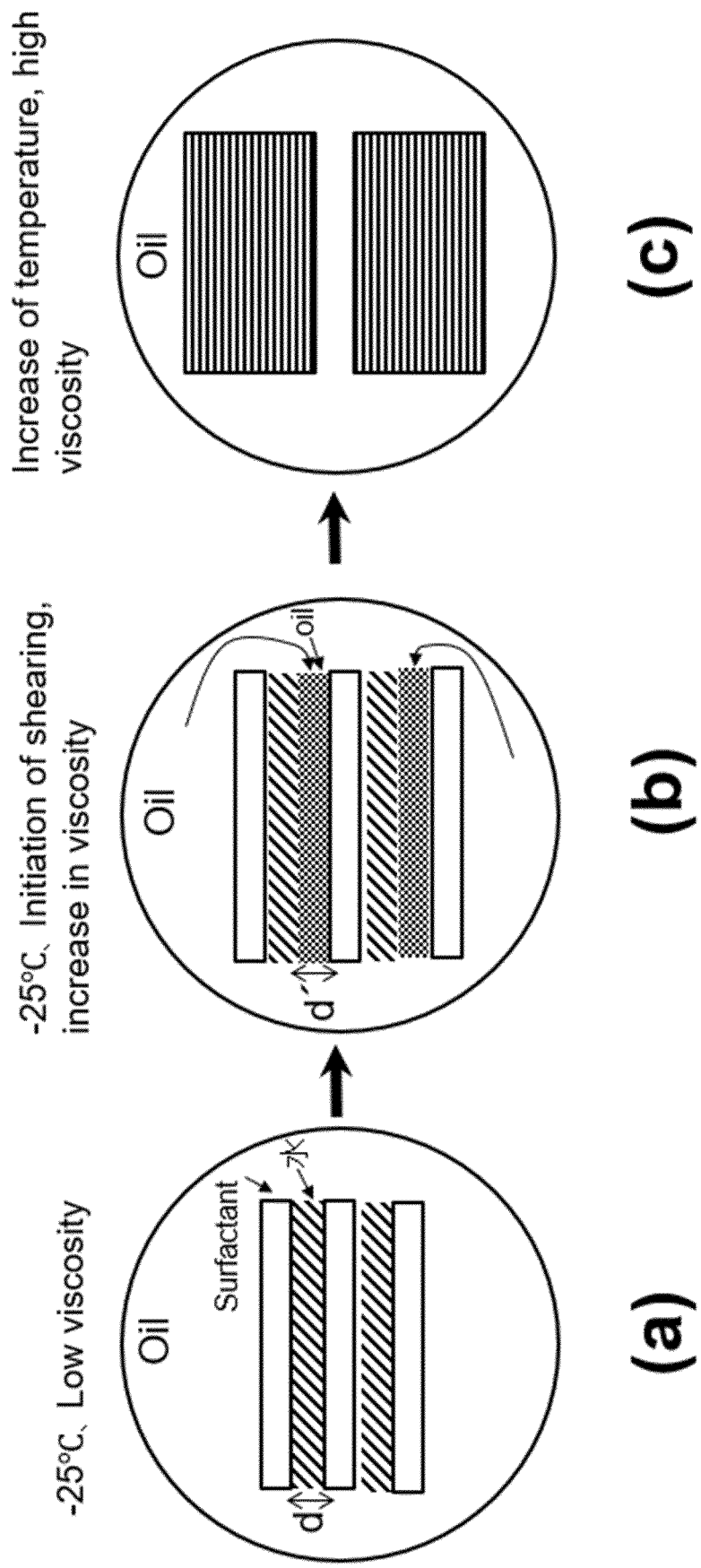
FIG. 3 is a schematic view illustrating formation and growth of a lamellar liquid crystal by a decrease in temperature of a water-in-oil type pre-emulsion in the liquid crystal phase formation unit of the production system of the oil-in-water type emulsion according to the embodiment of the present invention.

As illustrated in FIG. 3, when the pre-emulsion is cooled at the aforementioned temperature range, a structure in which the surfactant in a layer form (or another form) and a layer of water are alternately repeated as illustrated in FIG. 3(a) may be formed. Therefore, it is considered that a precursory frame of the lamellar liquid crystal is formed.

When shearing is performed in this state, the oil content is interposed between the layers of the frame. This state is as illustrated in FIG. 3(b), which is the lamellar liquid crystal. When this state is formed, the viscosity of the system is increased, but liquid crystals are infinitely associated. Therefore, the whole lamellar liquid crystal expresses structural viscosity. Accordingly, the viscosity does not simply increase, but so-called rubber elasticity physical properties can be confirmed.

Since a liquid crystal phase other than the lamellar liquid crystal is also said to be in an infinite association state, certain structural viscosity would be expressed. However, the association density of inside of the liquid crystal is lower than that of the lamellar liquid crystal. Therefore, the expressed structural viscosity is also lower than that of the lamellar liquid crystal. When a shear force in a certain direction is applied to the water-in-oil type emulsion, a dispersion component in the emulsion is elongated in a plane form according to a rate gradient of a layer flow caused by the shear rate, to form a highly-layered structure, that is, a lamellar structure.

Furthermore, when the lamellar liquid crystal is formed, rubber elasticity is expressed. When a load is applied to the product, it tends to collapse at a certain yield point. Although a non-lamellar liquid crystal may have rubber elasticity, only the lamellar liquid crystal has characteristics in which a yield point is shown.

Therefore, when a product obtained by applying a shear force in a certain direction to the water-in-oil type emulsion shows rubber elasticity and a yield point is shown during application of a load, it is considered that the lamellar liquid crystal is formed.

Thus, formation of the lamellar liquid crystal can be confirmed on the basis of this phenomenon. Insertion of lamellae between layers at such a low temperature is largely concerned with essentiality of a silicone. Free rotation of a main chain of a silicone is easy. Therefore, a silicone has a low glass transition point and can maintain flowability at a lower temperature as compared with a general organic polymer. In particular, a silicone can maintain flowability at such a low temperature as −25° C., and a fine phase separation structure such as the lamellar liquid crystal can be formed by an interaction with the surfactant and water. Therefore, a silicone allows a lamellar liquid crystal that cannot be formed using the general organic polymer at such a low temperature as −25° C. to be formed.

Herein, it is considered that, as the cooling temperature is lower, the aggregability of the lamellae is enhanced, and thus both the width d of a layer of water and the width d' of a layer of an oil per layer of lamellae become smaller, that is, the interlayer distance of the lamellar liquid crystal become smaller. This is considered to lead to a decrease in particle diameter of a final oil-in-water type emulsion. As empirically obtained from experimental results, as the physical properties of the whole lamellar liquid crystal become harder, the particle diameter of the final emulsion becomes smaller. This is consistent with the aforementioned estimation in which the interlayer distance of the lamellar liquid crystal affects the final particle diameter. As the interlayer distance of the lamellar liquid crystal becomes smaller, the number of hydrogen bonds that attract the layers increases. Therefore, it is considered that the hardness of the lamellar liquid crystal is enhanced.

As the interlayer distance of the lamellar liquid crystal becomes smaller, the variation of the interlayer distance also becomes smaller, and therefore the particle diameter distribution of the oil-in-water type emulsion to be finally obtained tends to become smaller.

When the lamellar liquid crystal is grown like FIG. 3(c), an activation energy with endotherm and friction heat due to an increase in viscosity are generated. The details will be described at the following paragraph.

When the lamellar liquid crystal is formed from the water-in-oil type pre-emulsion, an activation energy is required. The activation energy tends to be higher as the temperature of the water-in-oil type pre-emulsion is lower.

Therefore, at a stage of forming the lamellar liquid crystal and the liquid crystal phase for fragmentation, the constant rotation number of the rotor 38 is selected. Additionally, at a stage of producing the water-in-oil type pre-emulsion, the water-in-oil type pre-emulsion is cooled to a predetermined temperature according to the ratio of the amount of the surfactant to the amount of the oil content so that the temperature of the liquid crystal phase for fragmentation is equal to or lower than a selected temperature when the liquid crystal phase for fragmentation is completely formed. In this case, firstly, as compared with a case where the lamellar liquid crystal is formed form the water-in-oil type pre-emulsion at normal temperature, an increase in temperature when the liquid crystal phase for fragmentation is completely formed is suppressed. Secondly, the initial viscosity when formation of the lamellar liquid crystal is initiated is increased due to the water-in-oil type pre-emulsion cooled to a predetermined temperature, and therefore the activation energy required for formation of the lamellar liquid crystal is increased. Thirdly, the heating time of the lamellar liquid crystal in the closed space is selected due to the selected constant rotation number of the rotor 38, and the initial viscosity when formation of the lamellar liquid crystal is initiated is increased. This increases the shear energy generated. Accordingly, when the cooling temperature of the water-in-oil type pre-emulsion is selected, unnecessary heating of the lamellar liquid crystal formed in the closed space is suppressed. Thus, the shear energy applied to the water-in-oil type pre-emulsion and the activation energy required for formation of the lamellar liquid crystal are balanced. When the temperature at which the liquid crystal phase having a small structure is completely formed is set to a desired temperature, the particle diameter of oil droplets in the oil-in-water type emulsion can be adjusted.

The activation energy may vary according to a combination of the oil content and the surfactant, and therefore many trial and error are required. When the temperature of the pre-emulsion is decreased, the initial temperature of the pre-emulsion during formation of the lamellar liquid crystal is lower, and the activation energy is higher than that when the temperature of the pre-emulsion is not decreased. Therefore, an increase in temperature of the liquid crystal phase during completion of the liquid crystal phase for fragmentation can be suppressed.

For example, it is preferable that the aperture area of the slits, the angle distance between adjacent slits in a circumferential direction, and the size of the space be determined from the aforementioned viewpoints.

The oil-in-water type emulsion production unit 16 has a conventionally known emulsification dispersion device, like the water-in-oil type pre-emulsion production unit 12 and the liquid crystal phase formation unit 14. In the emulsification dispersion device, water for dilution is added to the liquid crystal phase formed in the liquid crystal phase formation unit 14, resulting in phase inversion. Thus, the oil-in-water type emulsion is produced. The flow rate of water for dilution is adjusted according to the state of the liquid crystal phase to which water for dilution is added.

At that time, the amount of water is excessive, and therefore phase inversion to the oil-in-water type emulsion that is energetically more stable than the lamellar liquid crystal is caused. A shear energy required for the phase inversion is sufficiently supplied by an emulsifier usually used. In the phase inversion, when the layer of the oil content in the lamellar liquid crystal is transformed into a particle of the final oil-in-water type emulsion, the particle is formed while the distance of the layer is maintained.

Specifically, the distance of the layer is considered to be the particle diameter. Therefore, effects of the lamellar liquid crystal do not largely depend on production conditions such as a difference in shear energy applied at this stage. This stage is not a process that is important for achievement of the object of the invention of the present application.

The oil-in-water type emulsion continuously produced is stored in a tank as appropriate.

In general, when the water-in-oil type pre-emulsion is produced at normal temperature as described above, the surfactant is polarized into a hydrophilic group and a hydrophobic group, which are present at an interface between an oil phase and a water phase. On the other hand, an extra surfactant is associated to form a micelle structure. When the temperature of the water-in-oil type pre-emulsion is decreased, for example, the water-in-oil type pre-emulsion is cooled to −25° C., a structure that has a degree of association higher than the micelle structure is formed form the surfactant. Therefore, when from the water-in-oil type pre-emulsion of which the temperature is decreased, the lamellar liquid crystal is formed, a necessary activation energy is higher than that for the water-in-oil type pre-emulsion at normal temperature. At the stage of forming the lamellar liquid crystal, an energy consumed as the activation energy is higher than the shear energy applied. In addition, the temperature of the water-in-oil type pre-emulsion during application of the shear energy is low. Therefore, an increase in temperature of the liquid crystal phase to be formed can be effectively prevented, and an increase in particle diameter of oil droplets of the oil-in-water type emulsion due to the increase in temperature can be suppressed. Furthermore, when the temperature to which the temperature of the water-in-oil type pre-emulsion is decreased is adjusted, the particles of oil droplets of the oil-in-water type emulsion can be adjusted.

In particular, when the rotation number of the rotor 38 in the liquid crystal phase formation unit 14 is constantly maintained, the shear energy applied to the water-in-oil type pre-emulsion in the closed space is increased with an increase in viscosity. When the rotation number of the rotor 38 that is constantly maintained is set on the basis of a relationship between the rotation number and the temperature of the water-in-oil type pre-emulsion of which the temperature is decreased during entry into the liquid crystal phase formation unit 14, the particle diameter of oil droplets of the oil-in-water type emulsion is adjusted, and the ununiformity of the liquid crystal phase formed with variation of the shear rate (the rotation rate of the rotor 38) is restricted. Accordingly, an increase in particle size distribution of oil droplets can be suppressed.

As a modification, a case where the oil-in-water type emulsion is continuously produced from a water-in-oil type emulsion by a liquid crystal emulsification method is especially exemplified. When the temperature of the water-in-oil type emulsion (pre-emulsion) is decreased, the activation energy required for formation of the lamellar liquid crystal is increased. Thus, an increase in temperature of the lamellar liquid crystal formed on the basis of the shear energy applied to the pre-emulsion is suppressed. Therefore, an increase in particles diameter of oil droplets in the oil-in-water type emulsion is suppressed, the temperature of the water-in-oil type emulsion (pre-emulsion) is decreased, and the shear energy applied to the pre-emulsion is also decreased. Thus, both the necessary activation energy and the applied shear energy can be adjusted to suppress an increase in particle diameter of oil droplets in the oil-in-water type emulsion and to adjust the particle diameter of the oil droplets.

In this case, when the temperature of the water-in-oil type emulsion (pre-emulsion) is decreased, the initial viscosity during formation of liquid crystal from the pre-emulsion is increased. Therefore, it is difficult to achieve a flow rate necessary for continuous production of the oil-in-water type emulsion. Accordingly, the temperature of the water-in-oil type emulsion (pre-emulsion) is decreased so that the flow rate can be achieved, and the necessary activation energy and the applied shear energy are balanced by decreasing the applied energy. This makes it possible to adjust the particle diameter of oil droplets.

For example, when the shear energy is applied to the pre-emulsion in the predetermined space between the rotated rotor and the stator, the applied shear energy can be increased or decreased by adjusting the rotation number of the rotor.

As the cooling temperature of the pre-emulsion, that is, the temperature of the lamellar liquid crystal is lower, the temperature of the liquid crystal phase for fragmentation, that is, the temperature of the emulsion immediately after the emulsifier is lower, but an increase in temperature, that is, a difference between the temperature of the lamellar liquid crystal and the temperature of the emulsion immediately after the emulsifier is larger. For example, when the temperature of the lamellar liquid crystal is −25° C., the temperature of the emulsion immediately after the emulsifier is 30° C. When the former is 20° C., the latter is 60° C.

This is estimated to be as follows.

It is considered that a temperature at which the lamellar liquid crystal collapses into a fine liquid crystal phase is constant regardless of a temperature at which the liquid crystal phase is produced, and this temperature falls within a range of −5° C. to 40° C.

At this temperature range, the liquid crystal phase is made fine by an endothermic reaction. At that time, the activation energy required for production of a liquid crystal phase, which is produced at a lower temperature, is higher, and therefore the degree of endotherm is larger. Therefore, within a temperature range for fragmentation, the degree of absorbing a shear energy provided from the outside of the liquid crystal phase of which the production temperature is lower is larger.

However, until the temperature increases to −5° C. at which fragmentation of a liquid crystal is initiated, the provided shear energy is not used for fragmentation of the liquid crystal, is dissipated as friction heat, and is used in exchange of heat of the air. Thus, the temperature of the system is increased to 25° C. When a liquid crystal phase produced at a very low temperature of −25° C. is sheared, the temperature increases to 25° C. Therefore, the degree of increase in temperature is large.

In contrast, an activation energy for production of a liquid crystal phase produced at a high temperature of 20° C. is low. Therefore, the degree of endotherm for fragmentation is small, and the temperature is higher than 50° C., which is a temperature at which fragmentation of the liquid crystal phase is completed. When the temperature is 50° C. or higher, the temperature further increases due to effects such as friction heat.

Figure 4:
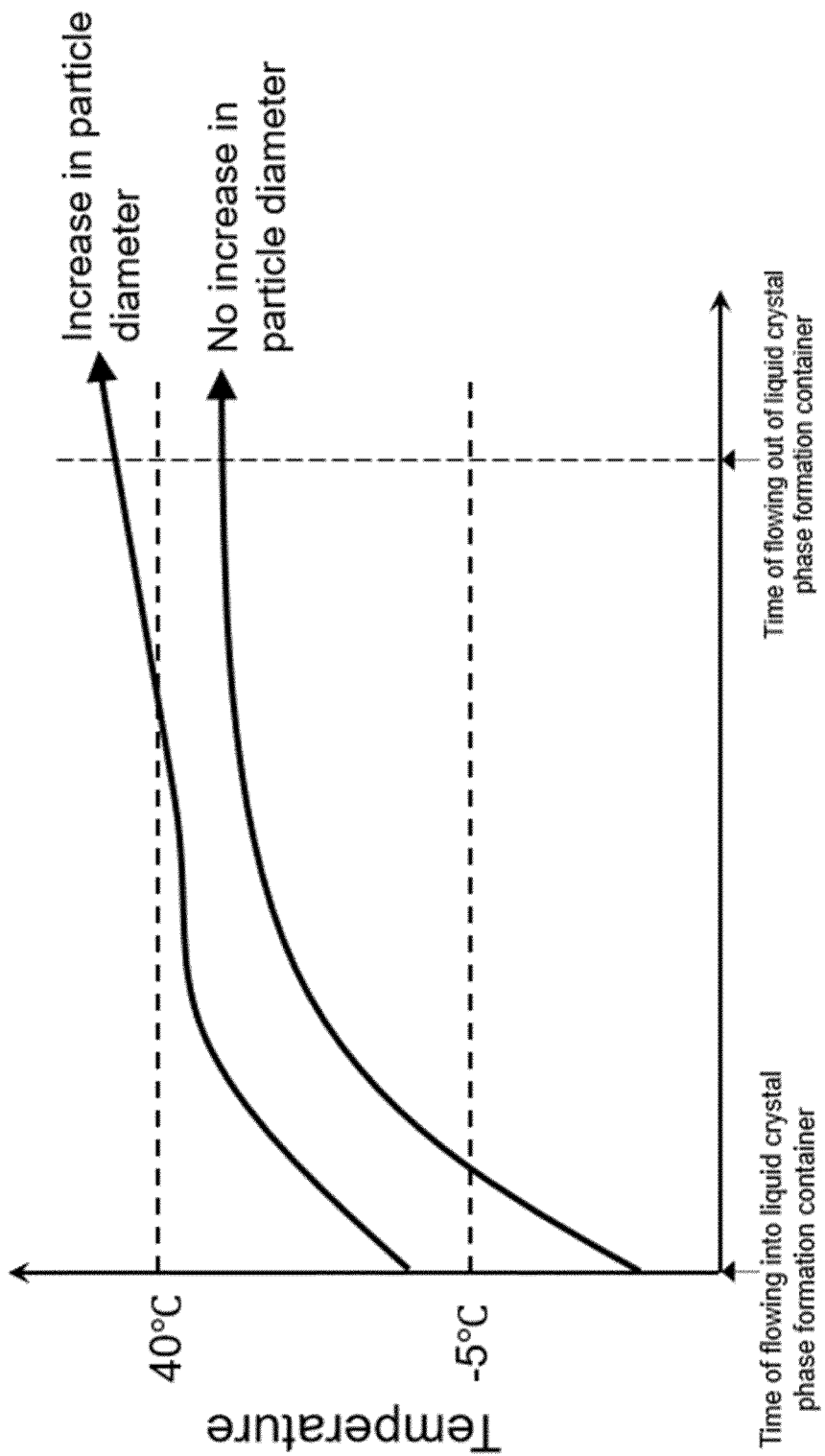
FIG. 4 is a view showing a relationship between a cooling temperature of the pre-emulsion and an increase in temperature after initiation of shearing in the liquid crystal phase formation unit of the production system of the oil-in-water type emulsion according to the embodiment of the present invention.

FIG. 4 is a diagram showing a relationship view between the cooling temperature of the pre-emulsion and an increase in temperature after initiation of shearing in the liquid crystal phase formation unit 14 of the production system 10 of the oil-in-water type emulsion according to the embodiment of the present invention.

In cooling of the pre-emulsion, it is necessary that freezing of the moisture content by itself, the surfactant by itself, or the moisture content and the surfactant be prevented during formation of the lamellar liquid crystal. This is because when they are frozen, the oil content cannot enter a space between the layers of the moisture content and the surfactant. Thus, it is preferable that the water-in-oil type emulsion that is the pre-emulsion be first completed and then cooled. Thus, a desired structure of the lamellar liquid crystal, that is, a continuous structure of three layers including a water layer, a surfactant layer, and an oil layer can be obtained at a predetermined cooling temperature.

The temperature may be decreased from the temperature during production or the temperature may be decreased during production of the water-in-oil type emulsion as long as freezing of the moisture content by itself, the surfactant by itself, or the moisture content and the surfactant can be prevented in advance. At a time point when the lamellar liquid crystal is being finally completed, it is necessary that the temperature reach the predetermined cooling temperature. However, when in or during production of the pre-emulsion, cooling is initiated, formation of the lamellar liquid crystal is initiated in a state where the composition is uneven, so that the finally formed lamellar liquid crystal may not be uniform. Therefore, it is preferable that the water-in-oil type emulsion be completed and then cooled.

EXAMPLES

The inventor of the present application performed a test of measuring the particle diameter of oil droplets of an oil-in-water type emulsion produced by the oil-in-water type emulsion production system 10 described in the embodiments using the temperature of a water-in-oil type pre-emulsion as a parameter.

Compositions of emulsions and conditions used in Examples and Comparative Examples, and results are shown in Table 1.

<Hardness Measurement Method (Method for Evaluating Production of Lamellar Liquid Crystal)>

In Examples and Comparative Examples, the following measurement and evaluation were performed using a simulator of simulating a liquid crystal phase formation container and the same conditions as production conditions, to confirm formation of a lamellar liquid crystal from a product that was obtained 0.03 seconds after application of a shear rate and to evaluate the degree of interlayer distance of the lamellar liquid crystal.

A 200-g wide-moused cup was filled with 200 g of the product, and the surface of the product was leveled at a pressure of 100 g/cm$^2$. A probe (½" stainless spherical, P/0.5S, load cell: 5 kg) was inserted at 1 mm/s using a texture analyzer (Texture Analyzer TA-XT2R manufactured by SMS). A force (g) observed when the depth reached 15 mm was measured within a range of up to 70 g. The presence or absence of yield point was also confirmed.

Evaluation Criteria:

Level 3=the force is 60 g or more. The interlayer distance of the lamellar liquid crystal is small.

Level 2=the force is 40 g or more and less than 60 g. The interlayer distance of the lamellar liquid crystal is moderate.

Level 1=the force is 20 g or more and less than 40 g. The interlayer distance of the lamellar liquid crystal is large and rough.

Level 0=the force is less than 20 g. Flowability is expressed, and a lamellar liquid crystal cannot be formed.

Example 1

50 Parts by mass of an organopolysiloxane having a methyl group and a vinyl group and having a viscosity of 5,000 mPa·s at 25° C. was prepared as the component (A), and 5.0 parts by mass of a nonionic surfactant (HLB=15.0) was prepared as the component (C). The amount ratio of the nonionic surfactant to an oil content as the component (D) was set to 0.1. A platinum catalyst in an amount of 100 ppm relative to the component (A) and a balance of purified water as the component (E) were prepared to produce 100 parts by mass of a water-in-oil type pre-emulsion. The initial viscosity immediately after production of this pre-emulsion was 6,000 mPa·s (25° C., 10 s$^{-1}$).

This pre-emulsion was cooled at −25° C. and stored until the whole temperature became constant. Separately from this, the pre-emulsion was caused to flow into a rotor-stator, which was a closed space and also served as a liquid crystal phase formation container, at a shear rate of 2,000 s$^{-1}$, and to pass through a shear gap for a residence time of 0.06 seconds. In the simulator of simulating the same conditions as the aforementioned production conditions, 0.03 seconds after application of shear rate, gelation occurred to lose flowability (the viscosity was immeasurable). The degree of gelation was high. The product exhibited rubber elasticity. The result of hardness measurement was level 3. A yield point was present. The temperature of an outlet of the liquid crystal phase formation container was 25° C.

When the product passed through the rotor-stator, the product was considered as a state of preparing formation of an oil-in-water type emulsion. The product together with a certain amount of water was further placed in a connected rotor-stator emulsifier to produce an oil-in-water type emulsion.

The average particle diameter of emulsion particles of the obtained oil-in-water type emulsion was measured to be 0.20 μm.

Example 2

52.5 Parts by mass of an organopolysiloxane having a methyl group and a vinyl group and having a viscosity of 5,000 mPa·s at 25° C. was prepared as the component (A), and 2.5 parts by mass of a nonionic surfactant (HLB=15.0) was prepared as the component (C). The amount ratio of the nonionic surfactant to an oil content as the component (D) was set to 0.05. A platinum catalyst in an amount of 100 ppm relative to the component (A) and a balance of purified water as the component (E) were prepared to produce 100 parts by mass of a water-in-oil type pre-emulsion. The initial viscosity immediately after production of this pre-emulsion was 6,100 mPa·s (25° C., 10 s$^{-1}$).

This pre-emulsion was cooled at −25° C. and stored until the whole temperature became constant. Separately from this, the pre-emulsion was caused to flow into a rotor-stator, which was a closed space and also served as a liquid crystal phase formation container, at a shear rate of 2,000 s$^{-1}$, and to pass through a shear gap for a residence time of 0.06 seconds. In the simulator of simulating the same conditions as the aforementioned production conditions, 0.03 seconds after application of shear rate, gelation occurred to lose flowability (the viscosity was immeasurable). The degree of gelation was high. The product exhibited rubber elasticity. The result of hardness measurement was level 3. A yield point was present. The temperature of an outlet of the liquid crystal phase formation container was 30° C.

When the product passed through the rotor-stator, the product was considered as a state of preparing formation of an oil-in-water type emulsion. The product together with a certain amount of water was further placed in a connected rotor-stator emulsifier to produce an oil-in-water type emulsion.

The average particle diameter of emulsion particles of the obtained oil-in-water type emulsion was measured to be 0.20 μm.

Example 3

50 Parts by mass of an organopolysiloxane having a methyl group and a vinyl group and having a viscosity of 5,000 mPa·s at 25° C. was prepared as the component (A), and 5.0 parts by mass of a nonionic surfactant (HLB=15.0) was prepared as the component (C). The amount ratio of the nonionic surfactant to an oil content as the component (D) was set to 0.1.

A platinum catalyst in an amount of 100 ppm relative to the component (A) and a balance of purified water as the component (E) were prepared to produce 100 parts by mass of a water-in-oil type pre-emulsion. The initial viscosity immediately after production of this pre-emulsion was 6,000 mPa·s (25° C., 10 s$^{-1}$).

This pre-emulsion was cooled at −10° C. and stored until the whole temperature became constant. Separately from this, the pre-emulsion was caused to flow into a rotor-stator, which was a closed space and also served as a liquid crystal phase formation container, at a shear rate of 2,000 s$^{-1}$, and to pass through a shear gap for a residence time of 0.06 seconds. In the simulator of simulating the same conditions as the aforementioned production conditions, 0.03 seconds after application of shear rate, gelation occurred to lose flowability (the viscosity was immeasurable). The degree of gelation was moderate. The product exhibited rubber elasticity. The result of hardness measurement was level 2. A yield point was present. The temperature of an outlet of the liquid crystal phase formation container was 25° C.

When the product passed through the rotor-stator, the product was considered as a state of preparing formation of an oil-in-water type emulsion. The product together with a certain amount of water was further placed in a connected rotor-stator emulsifier to produce an oil-in-water type emulsion.

The average particle diameter of emulsion particles of the obtained oil-in-water type emulsion was measured to be 0.22 μm.

Example 4

50 Parts by mass of an organopolysiloxane having a methyl group and a vinyl group and having a viscosity of 5,000 mPa·s at 25° C. was prepared as the component (A), and 5.0 parts by mass of a nonionic surfactant (HLB=13.0) was prepared as the component (C). The amount ratio of the nonionic surfactant to an oil content as the component (D) was set to 0.1. A platinum catalyst in an amount of 100 ppm relative to the component (A) and a balance of purified water as the component (E) were prepared to produce 100 parts by mass of a water-in-oil type pre-emulsion. The initial viscosity immediately after production of this pre-emulsion was 6,000 mPa·s (25° C., 10 s$^{-1}$).

This pre-emulsion was cooled at −25° C. and stored until the whole temperature became constant. Separately from this, the pre-emulsion was caused to flow into a rotor-stator, which was a closed space and also served as a liquid crystal phase formation container, at a shear rate of 2,000 s$^{-1}$, and to pass through a shear gap for a residence time of 0.06 seconds. In the simulator of simulating the same conditions as the aforementioned production conditions, 0.03 seconds after application of shear rate, gelation occurred to lose flowability (the viscosity was immeasurable). The degree of gelation was high. The product exhibited rubber elasticity. The result of hardness measurement was level 3. A yield point was present. The temperature of an outlet of the liquid crystal phase formation container was 25° C.

When the product passed through the rotor-stator, the product was considered as a state of preparing formation of an oil-in-water type emulsion. The product together with a certain amount of water was further placed in a connected rotor-stator emulsifier to produce an oil-in-water type emulsion.

The average particle diameter of emulsion particles of the obtained oil-in-water type emulsion was measured to be 0.20 μm.

Example 5

50 Parts by mass of an organopolysiloxane having a methyl group and a vinyl group and having a viscosity of 5,000 mPa·s at 25° C. was prepared as the component (A), and 5.0 parts by mass of a nonionic surfactant (HLB=15.0) was prepared as the component (C). The amount ratio of the nonionic surfactant to an oil content as the component (D) was set to 0.1.

A platinum catalyst in an amount of 100 ppm relative to the component (A) and a balance of purified water as the component (E) were prepared to produce 100 parts by mass of a water-in-oil type pre-emulsion. The initial viscosity immediately after production of this pre-emulsion was 6,000 mPa·s (25° C., 10 s$^{-1}$).

This pre-emulsion was cooled (or maintained) at 20° C. and stored until the whole temperature became constant. Separately from this, the pre-emulsion was caused to flow into a rotor-stator, which was a closed space and also served as a liquid crystal phase formation container, at a shear rate of 2,000 s$^{-1}$, and to pass through a shear gap for a residence time of 0.06 seconds. In the simulator of simulating the same conditions as the aforementioned production conditions, 0.03 seconds after application of shear rate, gelation occurred to lose flowability (the viscosity was immeasurable). The degree of gelation was low. The product exhibited rubber elasticity. The result of hardness measurement was level 1. A yield point was present. The temperature of an outlet of the liquid crystal phase formation container was 60° C.

When the product passed through the rotor-stator, the product was considered as a state of preparing formation of an oil-in-water type emulsion. The product together with a certain amount of water was further placed in a connected rotor-stator emulsifier to produce an oil-in-water type emulsion.

The average particle diameter of emulsion particles of the obtained oil-in-water type emulsion was measured to be 0.30 μm.

Example 6

54 Parts by mass of an organopolysiloxane having a methyl group and a vinyl group and having a viscosity of 5,000 mPa·s at 25° C. was prepared as the component (A), and 1 part by mass of a nonionic surfactant (HLB=15.0) was prepared as the component (C). The amount ratio of the nonionic surfactant to an oil content as the component (D) was set to 0.1.

A platinum catalyst in an amount of 100 ppm relative to the component (A) and a balance of purified water as the component (E) were prepared to produce 100 parts by mass of a water-in-oil type pre-emulsion. The initial viscosity immediately after production of this pre-emulsion was 6,200 mPa·s (25° C., 10 s$^{-1}$).

This pre-emulsion was cooled at −10° C. and stored until the whole temperature became constant. Separately from this, the pre-emulsion was caused to flow into a rotor-stator, which was a closed space and also served as a liquid crystal phase formation container, at a shear rate of 2,000 s$^{-1}$, and to pass through a shear gap for a residence time of 0.06 seconds. In the simulator of simulating the same conditions as the aforementioned production conditions, 0.03 seconds after application of shear rate, gelation occurred to lose flowability (the viscosity was immeasurable). The degree of gelation was moderate. The product exhibited rubber elasticity. The result of hardness measurement was level 1. A yield point was present. The temperature of an outlet of the liquid crystal phase formation container was 45° C.

When the product passed through the rotor-stator, the product was considered as a state of preparing formation of an oil-in-water type emulsion. The product together with a certain amount of water was further placed in a connected rotor-stator emulsifier to produce an oil-in-water type emulsion.

The average particle diameter of emulsion particles of the obtained oil-in-water type emulsion was measured to be 0.28 μm.

Comparative Example 1

50 Parts by mass of an organopolysiloxane having a methyl group and a vinyl group and having a viscosity of 5,000 mPa·s at 25° C. was prepared as the component (A), and 5.0 parts by mass of a nonionic surfactant (HLB=5.0) was prepared as the component (C). The amount ratio of the nonionic surfactant to an oil content as the component (D) was set to 0.1.

A platinum catalyst in an amount of 100 ppm relative to the component (A) and a balance of purified water as the component (E) were prepared to produce 100 parts by mass of a water-in-oil type pre-emulsion. The initial viscosity immediately after production of this pre-emulsion was 6,000 mPa·s (25° C., 10 s$^{-1}$).

This pre-emulsion was cooled at −25° C. and stored until the whole temperature became constant. Separately from this, the pre-emulsion was caused to flow into a rotor-stator, which was a closed space and also served as a liquid crystal phase formation container, at a shear rate of 2,000 s$^{-1}$, and to pass through a shear gap for a residence time of 0.06 seconds. In the simulator of simulating the same conditions as the aforementioned production conditions, 0.03 seconds after application of shear rate, the viscosity was increased but gelation did not occur. The product did not exhibit rubber elasticity. The result of hardness measurement was level 0. Any yield point was not present. The temperature of an outlet of the liquid crystal phase formation container was 25° C.

Thus, the resulting product was not in a state of preparing formation of an oil-in-water type emulsion.

Comparative Example 2

50 Parts by mass of an organopolysiloxane having a methyl group and a vinyl group and having a viscosity of 5,000 mPa·s at 25° C. was prepared as the component (A), and 5.0 parts by mass of a nonionic surfactant (HLB=19.5) was prepared as the component (C). The amount ratio of the nonionic surfactant to an oil content as the component (D) was set to 0.1.

A platinum catalyst in an amount of 100 ppm relative to the component (A) and a balance of purified water as the component (E) were prepared to produce 100 parts by mass of a water-in-oil type pre-emulsion. The initial viscosity immediately after production of this pre-emulsion was 6,000 mPa·s (25° C., 10 s$^{-1}$).

This pre-emulsion was cooled at −25° C. and stored until the whole temperature became constant. Separately from this, the pre-emulsion was caused to flow into a rotor-stator, which was a closed space and also served as a liquid crystal phase formation container, at a shear rate of 2,000 s$^{-1}$, and to pass through a shear gap for a residence time of 0.06 seconds. In the simulator of simulating the same conditions as the aforementioned production conditions, 0.03 seconds after application of shear rate, gelation occurred to lose flowability (the viscosity was immeasurable). The degree of gelation was low. The product exhibited rubber elasticity. The result of hardness measurement was level 1. A yield point was present. The temperature of an outlet of the liquid crystal phase formation container was 25° C.

When the product passed through the rotor-stator, the product was considered as a state of preparing formation of an oil-in-water type emulsion. The product together with a certain amount of water was further placed in a connected rotor-stator emulsifier to attempt production of an oil-in-water type emulsion. Emulsification however failed.

TABLE 1

| | | EXAMPLE 1 | EXAMPLE 2 | EXAMPLE 3 | EXAMPLE 4 |
|---|---|---|---|---|---|
| PRE-EMULSION PART BY MASS | (A) POLYMER HAVING VINYL AND METHYL GROUPS VISCOSITY 5,000 mPa·s | 50 | 52.5 | 50 | 50 |
| | (C) NONIONIC SURFACTANT (HLB = 15.0) | 5 | 2.5 | 5 | — |
| | (C) NONIONIC SURFACTANT (HLB = 13.0) | — | — | — | 5 |
| | (C) NONIONIC SURFACTANT (HLB = 5.0) | — | — | — | — |
| | (C) NONIONIC SURFACTANT (HLB = 19.5) | — | — | — | — |
| | (D) PLATINUM CATALYST | 100 ppm | 100 ppm | 100 ppm | 100 ppm |
| | (E) PURIFIED WATER | 45 | 45 | 45 | 45 |
| | SUM | 100 | 100 | 100 | 100 |
| | RATIO OF AMOUNT OF SURFACTANT TO AMOUNT OF OIL CONTENT | 0.1 | 0.05 | 0.1 | 0.1 |
| COOLING TEMPERATURE OF PRE-EMULSION (° C.) | | −25 | −25 | −10 | −25 |
| INITIAL VISCOSITY OF PRE-EMULSION (mPa·s) (25° C., 10 s$^{-1}$) | | 6,000 | 6,100 | 6,000 | 6,000 |
| SHEAR RATE TO PRE-EMULSION (s$^{-1}$) | | 2,000 | 2,000 | 2,000 | 2,000 |
| PASSAGE TIME THROUGH ROTOR-STATOR (s) | | 0.06 | 0.06 | 0.06 | 0.06 |

TABLE 1-continued

| PHYSICAL PROPERTIES IN LIQUID CRYSTAL PHASE FORMATION CONTAINER (PHYSICAL PROPERTIES OF PRODUCT IN SIMULATOR AFTER 0.03 SEC) | VISCOSITY | LOSS OF FLOWABILITY DUE TO GELATION (VISCOSITY WAS IMMEASURABLE) DEGREE OF GELATION WAS HIGH | LOSS OF FLOWABILITY DUE TO GELATION (VISCOSITY WAS IMMEASURABLE) DEGREE OF GELATION WAS HIGH | LOSS OF FLOWABILITY DUE TO GELATION (VISCOSITY WAS IMMEASURABLE) DEGREE OF GELATION WAS MODERATE | LOSS OF FLOWABILITY DUE TO GELATION (VISCOSITY WAS IMMEASURABLE) DEGREE OF GELATION WAS HIGH |
|---|---|---|---|---|---|
| | HARDNESS LEVEL | 3 | 3 | 2 | 3 |
| TEMPERATURE OF OUTLET OF LIQUID CRYSTAL PHASE FORMATION CONTAINER (° C.) | | 25 | 30 | 25 | 25 |
| AVERAGE PARTICLE DIAMETER OF FINAL EMULSION (μm) | | 0.20 | 0.20 | 0.22 | 0.20 |

| | | EXAMPLE 5 | EXAMPLE 6 | COMPARATIVE EXAMPLE 1 | COMPARATIVE EXAMPLE 2 |
|---|---|---|---|---|---|
| PRE-EMULSION PART BY MASS | (A) POLYMER HAVING VINYL AND METHYL GROUPS VISCOSITY 5,000 mPa · s | 50 | 54 | 50 | 50 |
| | (C) NONIONIC SURFACTANT (HLB = 15.0) | 5 | 1 | 5 | 5 |
| | (C) NONIONIC SURFACTANT (HLB = 13.0) | — | — | — | — |
| | (C) NONIONIC SURFACTANT (HLB = 5.0) | — | — | 5 | — |
| | (C) NONIONIC SURFACTANT (HLB = 19.5) | — | — | — | 5 |
| | (D) PLATINUM CATALYST | 100 ppm | 100 ppm | 100 ppm | 100 ppm |
| | (E) PURIFIED WATER | 45 | 45 | 45 | 45 |
| | SUM | 100 | 100 | 100 | 100 |
| | RATIO OF AMOUNT OF SURFACTANT TO AMOUNT OF OIL CONTENT | 0.1 | 0.02 | 0.1 | 0.1 |
| COOLING TEMPERATURE OF PRE-EMULSION (° C.) | | 20 | −10 | −25 | −25 |
| INITIAL VISCOSITY OF PRE-EMULSION (mPa · s) (25° C., 10 s$^{-1}$) | | 6,000 | 6,200 | 6,000 | 6,000 |
| SHEAR RATE TO PRE-EMULSION (s$^{-1}$) | | 2,000 | 2,000 | 2,000 | 2,000 |
| PASSAGE TIME THROUGH ROTOR-STATOR (s) | | 0.06 | 0.06 | 0.06 | 0.06 |
| PHYSICAL PROPERTIES IN LIQUID CRYSTAL PHASE FORMATION CONTAINER (PHYSICAL PROPERTIES OF PRODUCT IN SIMULATOR AFTER 0.03 SEC) | VISCOSITY | LOSS OF FLOWABILITY DUE TO GELATION (VISCOSITY WAS IMMEASURABLE) DEGREE OF GELATION WAS LOW | LOSS OF FLOWABILITY DUE TO GELATION (VISCOSITY WAS IMMEASURABLE) DEGREE OF GELATION WAS MODERATE | GELATION WAS NOT ACHIEVED | LOSS OF FLOWABILITY DUE TO GELATION (VISCOSITY WAS IMMEASURABLE) DEGREE OF GELATION WAS HIGH |
| | HARDNESS LEVEL | 1 | 2 | 0 | 1 |
| TEMPERATURE OF OUTLET OF LIQUID CRYSTAL PHASE FORMATION CONTAINER | | 60 | 45 | 25 | 25 |
| AVERAGE PARTICLE DIAMETER OF FINAL EMULSION (μm) | | 0.30 | 0.28 | — | EMULSIFICATION IMPOSSIBLE |

From the results of Examples and Comparative Examples, the following is introduced.

1. In each Example, the viscosity increased to an immeasurable value 0.03 seconds after shearing of the pre-emulsion. Gelation was achieved to lose flowability, and rubber elasticity, constant hardness, and a yield point were exhibited. Therefore, it is inferred that production of a lamellar liquid crystal in the liquid crystal phase formation container was confirmed. Finally, the product was not a gel, and the oil-in-water type emulsion was produced. Thus, it is inferred that liquid crystal emulsification through a lamellar liquid crystal was achieved.

In Comparative Example 1, gelation was not achieved by shearing under the same conditions. Thus, it is inferred that a lamellar liquid crystal was not produced. In Comparative Example 2, gelation was achieved to lose flowability, and rubber elasticity, constant hardness, and a yield point were exhibited. Thus, it is inferred that a lamellar liquid crystal was produced in the liquid crystal phase formation container. However, emulsification for formation of an oil-inwater type emulsion was not achieved, and therefore liquid crystal emulsification was not achieved.

Accordingly, it is necessary that the HLB of used surfactant fall within a predetermined range to achieve liquid crystal emulsification.

2. In Examples 1 to 4, the average particle diameters of the obtained oil-in-water type emulsions were 0.20 to 0.22 which were a preferable diameter. In Examples 1, 2, and 4, the cooling temperatures of the pre-emulsions were −25° C. In Example 3, the cooling temperature was −10° C. In Examples 1, 2, and 4, the particle diameter of the final oil-in-water type emulsion was 0.20 In Example 3, the particle diameter was 0.22 As the temperature of cooling was lower, the degree of agglomeration of a lamellar liquid crystal was larger, that was, the interlayer distance of the lamellar liquid crystal was smaller. Thus, it is inferred that the particle diameter become smaller.

In Examples 5 and 6, the average particle diameters of the obtained oil-in-water type emulsions were 0.28 to 0.30 which were nota preferable diameter. In Example 5, the cooling temperature was 20° C. Therefore, the degree of agglomeration of a lamellar liquid crystal was small, and the final particle diameter was large. In Example 6, the cooling temperature was −10° C., but the amount ratio of the surfactant to the silicone oil content was small. Thus, it is inferred that the degree of agglomeration of a lamellar liquid crystal was not increased and the final particle diameter was large. In Examples 5 and 6, the temperature of the outlet of the liquid crystal phase formation container was as high as 60° C. and 45° C., respectively. Therefore, it was also possible to cause an increase in particle diameter.

Accordingly, the width of layer of the oil content per layer of lamellae is decreased, and the particle size of the oil content of the oil-in-water type emulsion formed on the basis of this width is decreased. Specifically, it is inferred that setting of the cooling temperature of the pre-emulsion affects the particle size of the oil content of the oil-in-water type emulsion through the lamellar liquid crystal.

As described above, the embodiments of the present invention are described in detail. Various modifications or alterations may be made by those skilled in this art without departing from the scope of the present invention.

In the embodiment, as the liquid crystal phase formation unit 14 that is a continuous type configured to apply a shear energy to a water-in-oil type emulsion supplied to the liquid crystal phase formation unit 14, the rotor-stator type liquid crystal phase formation unit is described, but the liquid crystal phase formation unit 14 is not limited to this. For example, the liquid crystal phase formation unit may be a batch-type liquid crystal phase formation unit in which a water-in-oil type pre-emulsion is stored in an opened container and a shear energy is applied circularly and repetitively as long as the temperature during production of an oil-in-water type emulsion is set to a predetermined temperature for adjustment of a lamellar liquid crystal of a liquid crystal emulsion.

In the embodiment, as the liquid crystal phase formation unit 14 that is a continuous type configured to apply a shear energy to a water-in-oil type emulsion supplied to the liquid crystal phase formation unit 14, the rotor-stator type liquid crystal phase formation unit is described, but the liquid crystal phase formation unit 14 is not limited to this. For example, the liquid crystal phase formation unit may be a batch-type liquid crystal phase formation unit in which a water-in-oil type pre-emulsion is stored in an opened container and a shear energy is applied circularly and repetitively as long as the temperature during production of an oil-in-water type emulsion is set to a predetermined temperature to adjust a lamellar liquid crystal of a liquid crystal emulsion and an activation energy to be absorbed in an endothermic reaction can be applied to the oil-in-water type emulsion.

In the embodiment, a continuous-type liquid crystal phase formation unit is described as the liquid crystal phase formation unit 14, but the liquid crystal phase formation unit 14 is not limited to this. For example, the liquid crystal phase formation unit 14 may be a batch-type liquid crystal phase formation unit in which a water-in-oil type pre-emulsion is stored in an opened container and a shear energy is applied circularly and repetitively as long as an increase in temperature of a liquid crystal phase with application of an extra shear energy can be caused in the liquid crystal phase formation unit 14.

In the embodiment, for a rotor, a tubular structure that has a predetermined space between the rotor and a stator is described, but the rotor is not limited to this. In the liquid crystal phase formation unit 14, for example, a plurality of rotor blades may be provided on an outer circumferential surface at predetermined angle intervals as long as a shear energy can be applied.

| | Reference Signs List |
|---|---|
| 10 | oil-in-water type emulsion production system |
| 12 | water-in-oil type pre-emulsion production unit |
| 14 | liquid crystal phase formation unit |
| 16 | oil-in-water type emulsion production unit |
| 18 | pipe |
| 20 | liquid transfer pump |
| 22 | emulsification dispersion unit |
| 24 | cooling unit |
| 26 | plate-type heat exchanger |
| 28 | refrigerant temperature adjustment unit |
| 30 | temperature detection unit |
| 32 | inlet |
| 34 | outlet |
| 36 | liquid crystal phase formation container |
| 37 | central axis |
| 38 | rotor |
| 39 | predetermined space |
| 40 | stator |
| 42 | slit |
| 43 | motor |
| 44 | liquid crystal phase formation container outlet temperature meter |

The invention claimed is:

1. A liquid crystal emulsification method comprising:
in a water-in-oil type pre-emulsion production unit a water-in-oil type pre-emulsion is produced, then transferred to a liquid crystal phase formation unit, wherein a liquid crystal phase in a transition state between a water-in-oil type pre-emulsion and an oil-in-water type emulsion is formed, then transferred to the oil-in-water type emulsion production unit, wherein an oil-in-water type emulsion is produced,
characterized in that, adding a moisture content and a silicone composition as an oil content at a predetermined ratio to a nonionic surfactant having an HLB falling within a predetermined range which represents a balance of hydrophilicity and lipophilicity, of 8.0 to 19.0; setting a temperature during formation of a dispersion or an emulsion to a predetermined temperature by cooling to a temperature selected from a temperature range of −40° C. to −5° C. and obtaining a final oil-in-water type emulsion with a particle diameter of 0.20 to 0.22 µm, and a predetermined shear energy is applied according to the selected temperature to adjust a lamellar liquid crystal having a regular molecular arrangement in which the oil content and the moisture content are alternately arranged in a bilayer membrane formed from the surfactant.

2. The liquid crystal emulsification method according to claim 1, wherein an O/W emulsion including a nonionic surfactant, a silicone composition as an oil content, and a moisture content is formed at a predetermined temperature, and then cooled over a predetermined temperature, to form a lamellar liquid crystal having a regular molecular arrangement in which the oil content and the moisture content are alternately arranged in the bilayer membrane formed from the surfactant.

\* \* \* \* \*